E. H. MESSITER.
AUTOMATIC CONTROL OF CONVEYERS.
APPLICATION FILED MAR. 22, 1912.

1,125,704.

Patented Jan. 19, 1915.

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

AUTOMATIC CONTROL OF CONVEYERS.

1,125,704.

Specification of Letters Patent.

Patented Jan. 19, 1915.

Application filed March 22, 1912. Serial No. 685,483.

*To all whom it may concern:*

Be it known that I, EDWIN H. MESSITER, a citizen of the United States of America, and a resident of Brooklyn, county of Kings, and State of New York, have invented certain new and useful Improvements in Automatic Control of Conveyers, of which the following is a specification, reference being had to the accompanying drawings, forming a part thereof.

This invention relates to an improvement in weighing mechanism, and more particularly to the continuous weighing of material as it is carried by a traveling conveyer.

The object of the invention is to provide a continuous weighing mechanism arranged to weigh various kinds of material and to maintain a predetermined proportion between the weights of the various materials conveyed.

In order that the invention may be thoroughly understood, I will describe an embodiment thereof, having reference to the accompanying drawing illustrating the same, and will then point out the novel features in claims.

Figure 2:
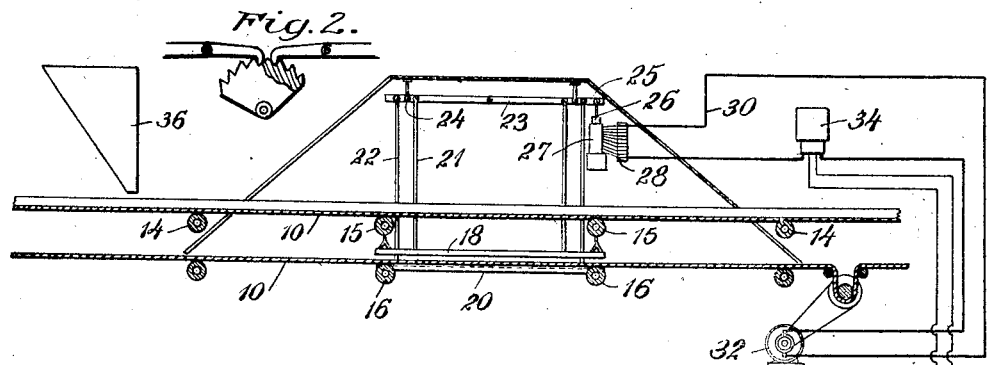
Figure 1:
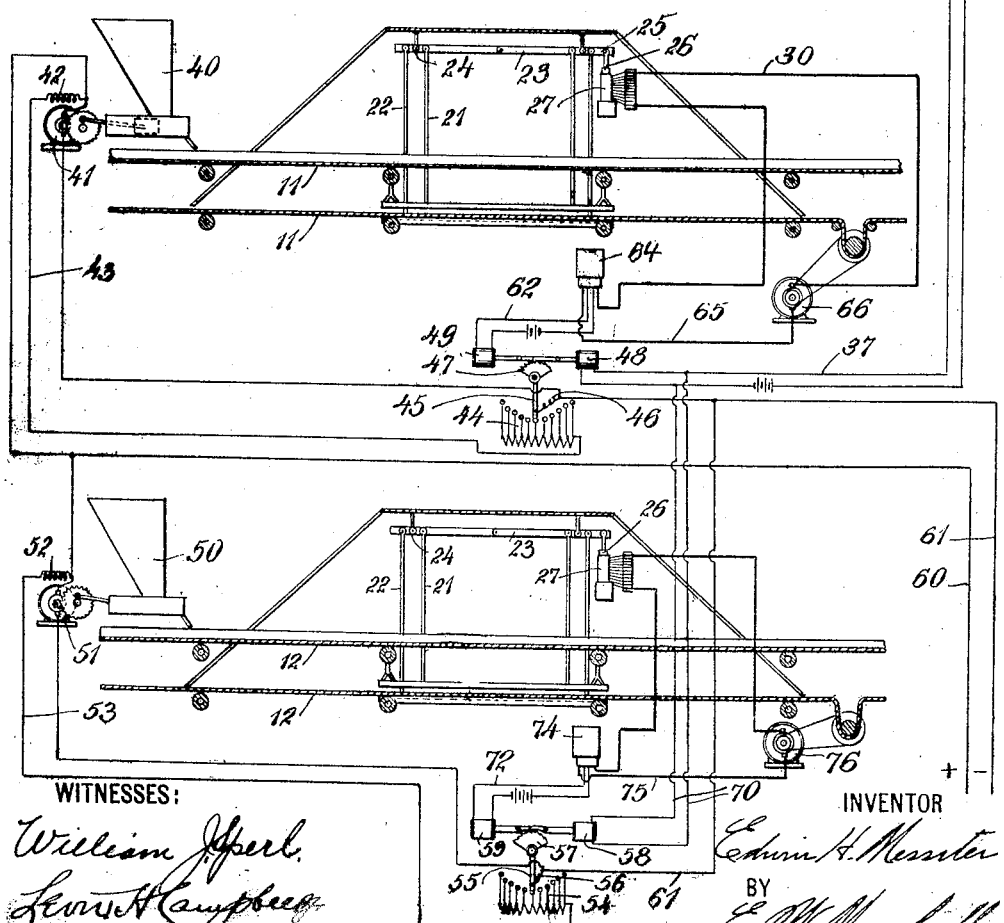

Figure 1 of the accompanying drawing is a diagrammatic view of one embodiment of the invention arranged to feed and weigh three kinds of material simultaneously. Fig. 2 is a detail of one of the sectors and its coöperating pawls, a portion of said sector being broken away to more clearly show its construction.

The traveling conveyers upon which the material to be weighed is carried are here shown in the form of three endless conveyer belts 10, 11 and 12. The upper runway of each belt is supported by suitable pulleys 14, 15, preferably troughing; and the lower runway is supported by ordinary cylindrical drums or pulleys 16. Two pulleys 15 for the upper runway of the belt are carried by a frame 18, and two idler pulleys 16 are similarly carried by a frame 20. The frames 18 and 20 are connected respectively by means of rods 21, 22 with two weighing levers 23. The connections of the rods 21, 22 are upon opposite sides of the fulcrums, or points of support 24, of the weighing levers, whereby the two platforms or frames 18, 20, will counterbalance each other, and the empty belt portions will also be counterbalanced. This method of counterbalancing is not claimed herein but is illustrated for the purpose of disclosing a complete operative machine. It is specifically described and claimed in my Patent No. 998,974, issued July 25th, 1911.

The left hand lever 23 extends to the right beyond the right hand lever and this extension 25, has pivotally connected to the end thereof a plunger 26. This plunger enters a casing 27 having a mercury bath coöperating with a variable resistance device 28. This resistance device is described and claimed in my Patent No. 1,014,604, issued January 9th, 1912.

The supporting mechanisms for the belts 11 and 12 are the same as that for the belt 10. The resistance 28 is arranged in a circuit 30 fed by a generator 32 and also including an ampere-hour meter 34. The speed of the generator 32 is arranged to be proportionate to the speed of movement of the conveyer belt, a convenient method of maintaining the proportion being to connect said generator in driving relation with a pulley in engagement with the conveyer belt. In the arrangement of the circuit 30 as shown, the amount of current permitted to pass through the instrument 34 will be proportionate, first to the speed of the generator 32, and second, inversely to the amount of resistance interposed in the circuit. As the speed of the generator 32 is proportionate to the speed of the conveyer belt, and the amount of resistance 28 interposed in the circuit 30 is proportionate to the movement of the plunger 26, which movement is determined by the weight of the material as it passes over the platform 18, said material being fed from a hopper 36, or what may be termed a master feeding device, it will then follow that the indication or registration of the instrument 34 at any moment will be exactly proportionate to the weight carried and the speed at which it is carried past a given point at such moment.

The conveyers 11 and 12 are arranged to be fed from hoppers 40 and 50, from which the material is discharged by motors 41 and 51 respectively, the arrangement being such that the weights of the materials fed from the hoppers 36, 40 and 50 bear a predetermined proportion to one another. A convenient example of such an arrangement would be one adapted to feed four parts iron ore, two parts coke, and one part of limestone to a blast furnace, these proportions being maintained automatically irrespective of the actual quantity conveyed. To maintain automatically the desired relation between the amounts of material conveyed by the several belts, the motors 41 and 51 are arranged to have the resistances of their field circuits controlled partly by the instrument 34 and partly by mechanism controlled by the speed of belts 11 and 12. The motors 41 and 51 are connected to leads 60, 61 from some suitable source of electrical supply and are provided with shunt field coils 42, 52 connected at one end by conductors 43, 53 respectively, with one end of variable resistances 44, 54. The amount of resistance in the shunt field circuits is varied by contact carrying arms 45 and 55, which are connected by conductors 46 and 56, respectively, to the lead 61. The arm 45 is provided with a pair of toothed sectors 47 which coöperate with pawls operated by magnet coils 48 and 49. The specific construction of these magnets and pawls is not claimed herein but is specifically described and claimed in my application serially numbered 685,484 filed herewith. The coil 48 is connected in an auxiliary circuit 37 controlled by the meter 34, and the coil 49 is in an auxiliary circuit 62 controlled by a meter 64. The meter 64 is connected in a circuit 65 fed by a generator 66 which is in driving relation with the belt 11. The speed with which the belt 11 is driven and the weight of the material thereon determines the amount of current passing through the circuit 65, and this current operates the meter 64, the speed of said meter being dependent upon the current passing therethrough. The meter 64 is provided with a circuit controller, such as that described and claimed in my application serially numbered 685,484 filed herewith, whereby the circuit 62 is periodically closed as the meter shaft rotates. Thus the number of impulses sent through the coil 49 depends upon the rate of rotation of said meter shaft.

The arm 55 is provided with toothed sectors 57 which coöperate with pawls operated by magnet coils 58 and 59. The coil 58 is connected in a branch 70 of the auxiliary circuit 37 controlled by the meter 34, and the coil 59 is in an auxiliary circuit 72 controlled by the meter 74. The meter 74 is connected in a circuit 75, fed by a generator 76 which is in driving relation with the belt 12. The speed with which the belt 12 is driven and the weight thereon determine the amount of current passing through the circuit 75, and this current operates the meter 74, the speed of said meter being dependent on the current passing therethrough. This meter is also provided with a circuit controller, whereby the circuit 72 is periodically closed as the meter shaft rotates.

From the foregoing it will be noted that the resistances 44 and 54 connected to the field coils 42 and 52, respectively, are each controlled by two magnet coils, one of said coils being controlled from the meter 34 in the main circuit, and the other being controlled by a circuit which is dependent upon the current generated by the corresponding belt, as will be more fully described. Thus, for example, if the hopper 36 feeds an increased amount of material to the belt 10, the plunger 26 will be forced downward to reduce the amount of resistance 28 in the circuit 30, thus increasing the current in said circuit and consequently speeding up the meter 34. The circuit controller in said meter, therefore closes the auxiliary circuit 37 more frequently, thereby causing more frequent impulses to be sent through the coils 48 and 58. These coils cause the pawls connected therewith to move the sectors 47 and 57, respectively, to swing the arms 45 and 55 toward the left and cut in more of the resistances 44 and 54. This increases the resistance in the shunt field coil circuits and causes the motors 41 and 51 to speed up, thereby feeding more material onto the belts 11 and 12. On the other hand, if the hopper 36 should feed less than the predetermined amount, the reduction in the weight upon the platform 18 would cause the plunger 26 to be raised. thereby increasing the amount of resistance in the circuit 30 and reducing the current flowing therein. The speed of rotation of the meter 34 is consequently reduced, and consequently the frequency of the impulses in the coils 48 and 58. If the frequency of the impulses in the coils 49 and 59 is then greater than in the coils 48 and 58, the arms 45 and 55 are swung toward the right and reduce the resistance in the field coil circuits to reduce the speed of the motors 41 and 51 and consequently the weight of material fed to the belts 11 and 12.

Similar results occur if the materials fed onto the conveyer belts 11 and 12 become for any reason too great or too little to maintain the proportional weights between them and the weight of the material passing over conveyer belt 10 in the desired proportions.

Of course the proportions of materials fed by the different conveyers may be varied to suit different conditions. Some of the ways in which such adjustments may be made are shown in my copending application for patent, serially numbered 685,484 to which reference has been made before. The conveyers may be driven at the same rate of speed or each may be driven at a different rate of speed. Obviously this invention may be applied to two or any greater number of conveyers.

The means for driving the conveyer belts is not shown, but in the specific embodiment of my invention which I have described, it may be assumed that they are each driven at a constant rate of speed.

The usual variations in speed in the conveyer belts are compensated for by the changes of voltage which follow and in the consequent changes of current in the meter circuits.

What I claim is:

1. A plurality of conveyers, means connected with each conveyer for generating an electric current proportional to the weight of material on said conveyer and to the rate of movement of the conveyer, and means actuated by the relative values of said currents for maintaining a fixed proportion between the relative rates at which materials are carried by said conveyers.

2. A plurality of conveyers, means connected with each conveyer for generating an electric current proportional to the weight of material on said conveyer and to the rate of movement of the conveyer, and means actuated by the relative values of said currents for regulating the proportion of the loads carried by said conveyers.

3. Continuous weighing mechanism comprising a plurality of means for conveying loads, a weighing device for each load conveying means, and means controlled by said weighing devices for regulating proportions of the loads carried by said conveying means.

4. Continuous weighing mechanism comprising a plurality of conveyers, a weighing device for each conveyer, and means controlled by said weighing devices for automatically maintaining a predetermined proportion between the loads on the conveyers.

5. Continuous weighing mechanism, comprising a plurality of conveyers, weighing means over which the conveyers are arranged to pass, a master feeding device for feeding material to one of the conveyers, one or more auxiliary feeding devices for feeding material to the other conveyers, and means for proportioning the amount of material fed by said auxiliary feeding devices in accordance with any variations in the amount of material fed by said master feeding device.

6. Continuous weighing mechanism, comprising a master conveying device, an electric circuit, means for proportioning the electric current in said circuit in accordance with the weight of the material and the speed at which it is being transported, means for measuring said current, one or more auxiliary conveying devices, and means controlled by the current in said circuit for controlling the operation of said auxiliary conveying devices.

7. Continuous weighing mechanism, comprising a master conveying mechanism, one or more auxiliary conveying mechanisms, means controlled by said master conveying mechanism for controlling each auxiliary conveying mechanism, and means under the direct control of each auxiliary conveying mechanism for coöperating with the master controlling mechanism to regulate the rate at which material is fed to the respective auxiliary conveyers.

8. Continuous weighing mechanism, comprising a master conveyer, weighing means over which the conveyer is arranged to pass, an electric circuit, an electric quantity meter therein, means including a variable resistance device controlled by said weighing means for varying the amount of current in the said circuit proportionately to the varying movements of the weighing mechanism as the conveyer passes thereover, an auxiliary conveyer, means for feeding material to said auxiliary conveyer, a motor for operating said feeding means, a generator in driving relation with said auxiliary conveyer, and means for varying the speed of said motor, said speed varying means being controlled by said quantity meter and by the current from said generator.

9. Continuous weighing mechanism, comprising a master conveyer, weighing means over which the conveyer is arranged to pass, an electric circuit, an electric quantity meter therein, means including a variable resistance device controlled by said weighing means for varying the amount of current in the said circuit proportionately to the varying movements of the weighing mechanism as the conveyer passes thereover, an auxiliary conveyer, means for feeding material to said auxiliary conveyer, a motor for operating said feeding means, a generator in driving relation with said auxiliary conveyer, a variable resistance in the field circuit of said motor, and opposed means for operating a contact device which coöperates with said variable resistance, one of said opposed means being arranged in a circuit controlled by said quantity meter, and the other of said opposed means being arranged in a circuit controlled by a quantity meter in said generator circuit.

In witness whereof, I have hereunto set my hand this 15th day of March 1912 in the presence of two subscribing witnesses.

EDWIN H. MESSITER.

Witnesses:
F. B. GRAVES,
ERNEST W. MARSHALL.